3,409,448
AMINE MODIFIED POLYOLEFIN WAX ADDUCTS, PROCESS FOR PREPARING THE SAME AND EMULSIONS THEREOF
Isaac J. Levine, East Brunswick, and Arthur K. Ingberman, Somerville, N.J., assignors to Union Carbide Corporation, a corporation of New York
No Drawing. Filed July 6, 1965, Ser. No. 469,840
20 Claims. (Cl. 106—10)

ABSTRACT OF THE DISCLOSURE

Process for preparing emulsifiable amine modified polyolefin wax adducts by reacting a polyolefin wax containing olefinic double bonds with an alkyl phosphite to form an adduct containing phosphonate ester groups and thereafter reacting the phosphonate ester groups with an amine having at least one reactive amino hydrogen atom.

This invention relates to amine modified polyolefin wax adducts which are readily emulsifiable in aqueous media to fine particle size, stable emulsions, to a process for preparing these modified polyolefin wax adducts, and to emulsions prepared therefrom.

Heretofore, emulsifiable polyolefin waxes have been prepared by oxidation or by adducting polyolefin waxes with polar compounds such as maleic anhydride, thioglycolic acid, and the like. Oxidation, however, is a random reaction that produces a variety of products that are usually undesirably colored and have objectionable odors. Adduction with polar compounds also suffers from serious drawbacks. For example, the adduction with maleic anhydride is a very high temperature reaction that requires long heating times leading to some decomposition of the maleic anhydride. Moreover, during the reaction some of the molecules are made larger by copolymerization and oxidative crosslinking. After emulsification, there is a tendency toward instability and breaking of the emulsion or "creaming." While many of the problems met with maleic anhydride are obviated through the use of thioglycolic acid, the high cost and unpleasant odor of this acid render its adducts with polyolefin waxes unsuitable for commercial use.

It has also been proposed to produce an emulsifiable polyethylene wax by thermally degrading a high molecular weight linear polyethylene at a temperature of from 150° to 400° C. in the presence of an organic phosphite to form an addition product having an average molecular weight of from 200 to 400. However, there are several drawbacks to this approach and the products produced thereby. For example, the thermal degradation of high molecular weight linear polyethylene in the presence of an organic phosphite requires impractically long reaction times and causes the organic phosphite, which is markedly unstable at polyethylene thermal degradation temperatures, to decompose to phosphine and related by-products which are malodorous and toxic. Kosolapoff, Organophosphorus Compounds, John Wiley & Sons, Inc., New York (1950), p. 182. Moreover, the product produced is undesirably colored and while emulsifiable yields a poorly colored emulsion.

It is therefore an object of this invention to provide a process for preparing a readily emulsifiable amine modified polyolefin wax adduct.

It is another object of this invention to provide amine modified polyolefin wax adducts emulsifiable to fine particle size, stable emulsions.

It is yet another object of this invention to provide fine particle size, stable emulsions of amine modified polyolefin wax adducts.

Broadly, the process of this invention for preparing readily emulsifiable amine modified polyolefin wax adducts comprises reacting a polyolefin wax having an average of at least about one-half of an olefinic double bond per polymer molecule and a molecular weight of from about 1000 to about 5000 with an alkyl phosphite to form an adduct thereof containing carbon-to-phosphorus bonds and thereafter reacting the adduct with an amine, defined in greater detail herein, to form a readily emulsifiable amine modified polyolefin wax adduct. This product can then be emulsified in a conventional manner to prepare fine particle size, stable emulsions.

The term "polyolefin" is used herein to denote normally solid homopolymers of alpha mono-olefinically unsaturated hydrocarbons as well as normally solid copolymers thereof. Suitable polyolefins include polyethylene, polypropylene, polyethylene-polypropylene copolymers and the like. Polyolefin waxes useful in this invention have an average of at least one-half, and preferably one, olefinic double bond per polymer molecule and a molecular weight of from about 1000 to about 5000. Preferred are crystalline polyolefin waxes. Polyolefin waxes typically contain at least one type of olefinic double bond and sometimes a combination of two or three different types of double bonds. A polyolefin wax molecule containing an olefinic double bond can be represented by the formula $RR_1C{=}CHR_2$ wherein R is an alkyl group and $R_1$ and $R_2$ each are hydrogen or an alkyl group. Where $R_1$ and $R_2$ are both hydrogen, the bond is termed a terminal vinyl type of double bond. Where $R_2$ is hydrogen and $R_1$ is an alkyl group, the bond is termed a vinylidene type of double bond where $R_1$ is hydrogen and $R_2$ is an alkyl group, the bond is termed an internal type of double bond. All of these types of olefinic double bonds are capable of entering into an addition reaction with an alkyl phosphite as is described more fully herein.

Polyolefin waxes can be prepared by the pyrolysis or thermal degradation of higher molecular weight polyolefin polymers or by the direct polymerization of an olefin monomer or monomers to a wax of desired molecular weight. Pyrolysis, for example, can be carried out in a heated pyrolysis tube at about 450° to 600° C. Linear, high density polyethylene waxes, those having a density of 0.94 and above, when modified in accordance with this invention and then emulsified provide hard, highly polishable waxes and are preferred for this reason. Polyethylene waxes having lower densities, as well as other polyolefin waxes can also be modified according to this invention and thereafter formed into fine particle size, stable emulsions.

Suitable alkyl phosphites that can be reacted with polyolefin waxes to form an adduct thereof have at least one hydrogen atom capable of entering into a free radical addition reaction with an olefinic double bond and can be represented by the formula $$H-\overset{X}{\underset{A}{P}}-OR_3$$

wherein X represents an oxygen or a sulfur atom, $R_3$ is an alkyl group having from 1 to 16 carbon atoms and A is hydrogen or $-OR_4$ wherein $R_4$ is an alkyl group having from 1 to 16 carbon atoms. Thus, as used herein, the term "phosphite" refers to both phosphites and thiophosphites. It should be understood that when A is $-OR_4$, $R_3$ and $R_4$ can be the same or different alkyl groups. Suitable alkyl phosphites include methyl dihydrogen phosphite, ethyl dihydrogen phosphite, n-butyl dihydrogen phosphite, n-heptyl dihydrogen phosphite, n-hexadecyl dihydrogen phosphite, dimethyl hydrogen phosphite, diethyl hydrogen phosphite, dipropyl hydrogen phosphite, di-n-butyl hydrogen phosphite, di-n-octyl hydrogen phosphite, di-n-pentadecyl hydrogen phosphite, methyl ethyl hydrogen phosphite, ethyl n-decyl hydrogen phosphite, methyl di-hydrogen thiophosphite, ethyl dihydrogen thiophosphite, n-undecyl dihydrogen thiophosphite, dimethyl hydrogen thiophosphite, diethyl hydrogen thiophosphite, di-n-butyl hydrogen thiophosphite, di-n-heptyl hydrogen thiophosphite, di-n-hexadecyl hydrogen thiophosphite, and the like. Inasmuch as the alkyl thiophosphites produce a modified polyolefin wax having a typical mercaptan odor, and the alkyl dihydrogen phosphites can under certain conditions lead to crosslinking, the dialkyl hydrogen phosphites are preferred for purposes of this invention. These preferred phosphites have the formula

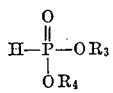

wherein $R_3$ and $R_4$ are as defined above. It should be noted that trialkyl phosphites are not suitable reactants in this invention because they do not have a hydrogen atom available to enter into a free radical addition reaction with the olefinic double bond present in the polyolefin waxes. For a detailed discussion of the mechanism of the free radical addition reaction between alkyl phosphites of the class described herein and the olefinic double bond, reference is made to Stacey et al., Organic Reactions, 13, 218–225, John Wiley and Sons, Inc., New York (1963).

The adduct of a polyolefin wax as described herein and an alkyl phosphite can be prepared by blending the polyolefin wax and alkyl phosphite in the liquid phase, for example in the melt or in solution, and reacting them in the presence of a free radical addition reaction initiator with agitation at a temperature of from about 130° C. to about 200° C., preferably from about 150° C. to about 190° C. Blending and agitation can be carried out in any manner which insures intimate admixing of the reactants and good heat transfer throughout the reaction mass during the reaction time.

If the addition reaction is conducted in solution, the reaction medium should be a liquid organic solvent inert with respect to the reactants under the reaction conditions and which is a solvent for the polyolefin wax and alkyl phosphite. Suitable solvents include benzene, cyclohexane, and the like, and halogenated hydrocarbon solvents such as chlorobenzene, ortho-dichlorobenzene, bromobenzene, α-chloronaphthalene and the like. It is preferred to use only as much solvent as will completely dissolve the polyolefin wax and alkyl phosphite.

It is preferred to conduct the addition reaction in the melt by heating the polyolefin wax to its melting point and above and blending in the alkyl phosphite.

Generally an excess over the amount of alkyl phosphite theoretically necessary to react with the olefinic double bonds present in the polyolefin wax molecules should be used in order to achieve good rates of reaction and to insure complete reaction. A high reaction rate is not necessarily the sole factor in determining the optimum amount of alkyl phosphite to be used. For example, it is only required that about 25 percent, preferably 50 percent, or above the olefinic double bonds be adducted to provide an ultimately emulsifiable product. Thus, the use of more alkyl phosphite than is required is unnecessary except to reduce the time needed to conduct the addition reaction.

The free radical addition reaction between the polyolefin wax and alkyl phosphite can be initiated by organic peroxides, organic azo compounds, ultraviolet radiation, and X-radiation. Stacey et al., supra, p. 219. Suitable organic peroxide initiators or catalysts include di-t-butyl peroxide, 2,5 - dimethyl-2,5-di(t-butyl peroxy)hexyne-3, dicumyl peroxide, benzoyl peroxide, lauroyl peroxide, and the like. Suitable organic azo compounds include azonitriles such as azo-bis-butyronitrile and the like. In using ultraviolet radiation as the initiator, a photosensitizer such as benzophenone should be present. In one embodiment, it is preferred to admix alkyl phosphite and initiator prior to adding polyolefin wax.

The addition reaction between an olefinic double bond and an alkyl phosphite, and the adduct formed can be shown as follows:

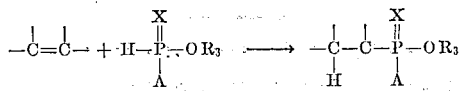

wherein A, $R_3$ and X are as defined previously. As indicated above the reactive olefinic double bond in the polyolefin wax molecule can be a terminal, vinylidene, or internal type of double bond. The addition product is termed a phosphonate ester of a polyolefin wax which, as indicated above, includes thiophosphonate esters.

According to the present invention, it has been unexpectedly discovered that polyolefin wax-phosphite adducts, or polyolefin waxes containing phosphonate ester groups, while difficultly emulsifiable, can be rendered readily emulsifiable by reacting the phosphonate ester groups of the adduct with an amine. Suitable amines have at least one reactive amino hydrogen atom and can be represented by the formula

wherein $R_5$ represents a monovalent organic radical having from 1 to 12 carbon atoms, $R_6$ represents hydrogen or a monovalent organic radical having from 1 to 12 carbon atoms, and $R_5$ and $R_6$ when interconnected, represent a heterocyclic ring.

The phrase "monovalent organic radical" as used herein refers to unsubstituted radicals as well as to substituted radicals. Exemplary of such monovalent radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated aliphatic and cycloaliphatic radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2 - chloro - n - butyl, 3 - chloro - n -amyl, 3 - bromo - n- amyl, 2 - chloro - n - hexyl, 2 - chlorocyclohexyl, and the like; alkoxy and aryloxy substituted alkyl and cycloalkyl radicals, such as methoxymethyl, ethoxyethyl, 3 - ethoxy - n - propyl, 4 - ethoxy - n - butyl, 3-ethoxy-2-ethyl-n-hexyl, 2-methoxycyclohexyl, phenoxymethyl, 2-phenoxyethyl, 3-phenoxy-n-propyl, 2-phenoxycyclohexyl, and the like; hydroxy substituted alkyl and cycloalkyl radicals; tertiary amino substituted alkyl and cycloalkyl radicals; aralkyl radicals, such as benzyl, 2-phenylethyl, 3-phenyl-n-propyl, 1-phenyl-n-butyl, 1-phenyl-n-dodecyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl, p-ethoxyphenyl, p-n-propoxyphenyl, and the like; hydroxy substituted aryl radicals; tertiary amino substituted aryl radicals; alkaryl radicals, such as o-methylphenyl, p-ethylphenyl, p-n-propylphenyl, o-n-propylphenyl, o-n-butylphenyl, p-n-dodecylphenyl, p-(2-ethyl-n-hexyl)phenyl, and the like; nitro substituted aryl radicals, such as p-nitrophenyl, 2-nitronaphthyl, and the like.

Illustrative of suitable amines where $R_5$ is a monovalent radical and $R_6$ is hydrogen or a monovalent radical are methylamine, ethylamine, n-butylamine,
n-octylamine,
dimethylamine,
diethylamine,
ethyl-n-propylamine,
di-n-butylamine,
allylamine,
cyclohexylamine,
cyclopentylamine,
ethoxyethylamine,
2-bromo-n-propylamine,
3-ethoxy-2-ethyl-n-hexylamine,
2-hydroxyethylamine,
2-hydroxypropylamine,
2-amino-1-butanol,
3-(N,N-di-n-butylamino)propylamine,
2-phenylethylamine,
1-phenyl-n-butylamine,
aniline,
m-toluidine,
2,3-xylidine,
mesidine,
1-naphthylamine,
N-methylaniline,
4-(N,N-diethylamino)aniline,
4-chloroaniline,
2-chloro-1-naphthylamine,
4-methoxyaniline,
4-ethoxyaniline,
4-hydroxyaniline,
4-nitroaniline,
N-propylallylamine,
N-phenylbenzylamine,
N-cyclohexylheptylamine,
3-(aminomethyl)pyridine,
1-naphthalenemethylamine,
2-pyrenamine, and the like. Illustrative of suitable amines where $R_5$ and $R_6$ together form a heterocyclic ring are pyrrole, 2-methylpyrrole, 3-ethylpyrrole, and the like.

Polyolefin wax-phosphite adducts can be reacted with an amine either in solution or in the melt at temperatures of from about 150° to about 300° C. for a period of time to react at least 25 percent, preferably 50 percent of the wax phosphonate ester groups with the amine. Generally about a stoichiometric amount of amine is employed but readily emulsifiable products can be obtained using less than stoichiometric amounts. In calculating the stoichiometry, one phosphonate ester group is presumed to react with one amino hydrogen atom. It is preferred to conduct the reaction in the absence of oxygen to secure a white product.

The amine modified polyolefin wax adducts are readily emulsifiable by conventional emulsion techniques to fine particle size, stable emulsions.

Typically the emulsions are prepared by melting the modified adduct and a fatty acid such as, for example, formic, acetic, propionic, butyric, valeric, caproic, enanthylic, caprylic, pelargonic, capric, undecylic, lauric, tridecoic, myristic, pentadecanoic, palmitic, megaric, stearic, nondecylic, arachidic, behenic, carnaubic, hyenic, carborceric, cerotic, laccroic, melissic, montanic, psyllic, acrylic, crotonic, isocrotonic, vinylacetic, methylacrylic, tiglic, angelic, senecioic, hexenic, teracrylic, hypogenic, oleic, elaidic, erucic, brassidic, propiolic, propynoic, tetrolic, 2-butynoic, pentinoic, 2-pentinoic, amylpropiolic, palmitotic, stearolic, behenolic, sorbic, linoleic and linolinic acids. These acids have the general formula

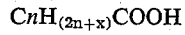

$$C n H_{(2n+x)}COOH$$

wherein $n$ is an integer from 0 to 32 and $x$ is an odd number from $-5$ to $+1$ with the proviso that when $n=0$, $x=+1$. An amine is then added such as mono- and triethanolamine, monoisopropanolamine, diisopropanolamine, triisopropanolamine, morpholine, N,N-dimethylethanolamine and N,N-diethylethanolamine. The mixture is stirred until thoroughly mixed or until it becomes clear. Water which has been heated to just below the melting point of the adduct is added with additional stirring. The mixture is then vigorously agitated in a suitable device, e.g., a bladed mixer, colloid mill or other shear producing apparatus to form the emulsion. Stable emulsions are obtained which generally vary less than 1 percent in solids content after standing in a separatory funnel for one week. An amine modified wax adduct solids content of from about 5 to 50 percent is preferred in these emulsions. The emulsions can also be prepared using ethoxylated fatty amines and acetic acid and with sodium alkyl sulfates and similar non-ionic emulsifiers.

Many modifications can be made in the present invention without departing from the spirit and scope thereof. For example, modified adducts can be prepared and emulsified as described herein from higher molecular weight polymers (those having a molecular weight greater than about 5000) containing ethylenic unsaturation as for example copolymers of ethylene and butadiene and the like. It is also possible to employ other phosphites and amines than those described herein, for instance polyalkyleneoxide phosphites, tertiary amines, and the like.

The modified polyolefin wax-phosphite adducts of this invention are useful in the preparation of wax emulsions which can be used as decorative and protective coatings for a wide variety of surfaces ranging from floor and wall tiles to shoe leathers and car polish. The modified adducts of this invention are also useful for promoting adhesion between various substrates and especially inert polymeric surfaces such as polyethylene. They are also useful as an additive in conventional printing ink formulations to improve ink adhesion to various surfaces especially polymeric surfaces. Furthermore, the modified adducts are useful as finishing agents for fibers and textiles.

Other ingredients can be added to the emulsions prepared according to this invention. For example, there can be included abrasives such as bentonite and tripoli, silicone oils such as methyl silicone, mineral spirits, clay and other fillers, colorants, extenders and modifiers.

The following examples are intended to further illustrate the present invention without limiting the same in any manner. All parts and percentages are by weight unless indicated otherwise.

PREPARATION OF POLYOLEFIN WAX-ALKYL PHOSPHITE ADDUCTS

Examples 1-21

GENERAL PROCEDURE—USING A SOLVENT

Into a 500 ml. flask equipped with a stirrer, thermometer, condenser and dropping funnel was placed 200 grams of polyethylene wax prepared by pyrolyzing at 480° C. polyethylene having a density of 0.96 and a melt index (ASTM D-1238-57T) of 5. The wax had a number average molecular weight of 2000 and contained an average of one olefinic double bond per polymer molecule, over 90 percent of which were terminal vinyl groups. Chlorobenzene and diethyl hydrogen phosphite were added to the wax in the flask and the reaction mass was heated to reflux at 169° C. A solution of a peroxide initiator in chlorobenzene was then added over about three minutes and the reaction mass was refluxed for the reaction time. Thereafter chlorobenzene and excess diethyl hydrogen phosphite were removed by vacuum distillation. The polyethylene wax-phosphite adduct was allowed to cool. The amount of reaction was determined by measuring the change in the vinyl double bond absorption of 11.02μ in the infrared. The product was a hard, white wax with absorptions in the infrared at 8.00μ, 8.59μ, 9.44μ and 9.67μ characteristic of an alkyl phosphonate ester. Results are summarized below.

| Example No. | Diethyl Hydrogen Phosphite, grams | Peroxide Initiator, grams | Chlorobenzene, ml. | Reaction Time | Percent Reaction |
|---|---|---|---|---|---|
| 1 | 20 | [1] 1.0 | 200 | 4 hrs | 50 |
| 2 | 40 | [1] 1.0 | 200 | 4 hrs | 100 |
| 3 | 40 | [1] 1.0 | 200 | 1.5 hrs | 83 |
| 4 | 40 | [1] 1.0 | 50 | 30 min | 100 |
| 5 | 40 | [1] 0.5 | 50 | 20 min | 90 |
| 6 | 25 | [1] 0.5 | 40 | 20 min | 68 |
| 7 | 25 | [1] 1.0 | 40 | 10 min | 86 |
| 8 | 25 | [1] 1.0 | 40 | 5 min | 86 |
| 9 | 18 | [1] 1.0 | 40 | 20 min | 75 |
| 10 | 16 | [1] 1.0 | 40 | 20 min | 65 |
| 11 | 20 | [2] 1.0 | 200 | 2 hrs | 45 |
| 12 | 40 | [2] 1.0 | 200 | 2 hrs | 67 |
| 13 | 25 | [2] 1.0 | 40 | 1 hr | 58 |
| 14 | 25 | [2] 1.0 | 80 | 30 min | 62 |
| 15 | 25 | [3] 1.0 | 40 | 55 min | 100 |
| 16 | 25 | [3] 0.5 | 40 | 20 min | 100 |
| 17 | 20 | [3] 0.5 | 40 | 20 min | 100 |
| 18 | 18 | [3] 0.5 | 40 | 20 min | 94 |
| 19 | 16 | [3] 0.5 | 40 | 20 min | 85 |
| 20 | 16 | [3][4] 0.5 | 40 | 20 min | 85 |
| 21 | 18 | [3] 0.5 | 40 | 5 min | 50 |

[1] 2,5-dimethyl-2,5-di-(t-butoxy)-hexyne-3.
[2] Dicumyl peroxide.
[3] Di-t-butyl peroxide.
[4] Peroxide was added over 10 minutes.

Examples 22–24

GENERAL PROCEDURE—IN THE MELT

Into a 500 ml. flask equipped with a stirrer and thermometer was placed 200 grams of the polyethylene wax described in Examples 1–21, diethyl hydrogen phosphite, and a peroxide initiator. The reaction mass was heated to the reaction temperature and held there with stirring for the reaction time. Excess diethyl hydrogen phosphite was removed by vacuum distillation. The product was a hard, white wax. Percent reaction was determined as in Examples 1–21. Results are summarized below:

| Example No. | Diethyl Hydrogen Phosphite, grams | Peroxide Initiator, grams | Reaction Temperature, °C. | Reaction Time | Percent Reaction |
|---|---|---|---|---|---|
| 22 | 40 | [1] 0.1 | 130–135 | 2 hrs | 40 |
| 23 | 40 | [1] 0.5 | 130–140 | 1.5 hrs | 55 |
| 24 | 40 | [2] 0.5 | 170–175 | 30 min | 75 |

[1] 2,5-dimethyl-2,5-di-(t-butoxy)-hexyne-3.
[2] Di-t-butyl peroxide.

Examples 25–30

GENERAL PROCEDURE—IN THE MELT

In a 2000 ml. flask equipped wit ha thermometer, dropping funnel, condenser, and stirrer was placed 1000 grams of polyethylene wax described in Examples 1–21. The wax was heated and a solution of di-t-butyl peroxide in diethyl hydrogen phosphite was added. The reaction mass was stirred for the reaction time and the reaction temperature and excess phosphite removed by vacuum distillation. The product was a hard, white wax. Percent reaction was determined as in Examples 1–21. Results are summarized below:

| Example No. | Diethyl Hydrogen Phosphite, grams | Di-t-butyl Peroxide, grams | Reaction Temperature, °C. | Reaction Time | Percent Reaction |
|---|---|---|---|---|---|
| 25 | 90 | 2.5 | 170 | [1] 45 min | 100 |
| 26 | 60 | 2.5 | 180 | [2] 15 min | 92 |
| 27 | 60 | 2.5 | 190 | [2] 10 min | 90 |
| 28 | 60 | 2.5 | 200 | [2] 10 min | 79 |
| 29 | 84 | 2.5 | 180 | [2] 15 min | 100 |
| 30 | 90 | 2.5 | 180 | [2] 15 min | 100 |

[1] Peroxide added over 30 minutes.
[2] Peroxide added over 5 minutes.

Example 31

Into a 500 ml. flask equipped with a stirrer, condenser, thermometer, and dropping funnel there was placed 2000 g. of a 0.88 density directly polymerized low density polyethylene. This material had a molecular weight of ~2500 and an average of about one-half of a double bond per polymer molecule. Most of the double bonds were of the vinylidene type but some internal and terminal type double bonds were also present. A mixture of 350 ml. of chlorobenzene and 180 g. of diethyl hydrogen phosphite were added and the mixture heated to reflux. A solution of 5 g. of di-t-butyl peroxide in 50 ml. of chlorobenzene was added rapidly and the mixture refluxed for 1 hour. After removal of the chlorobenzene and excess phosphite under vacuum, the product was cooled. Its infrared spectrum no longer exhibited any double bond absorption but did have characteristic alkyl phosphonate absorptions.

Example 32

Example 31 was duplicated using only 275 ml. of chlorobenzene and 90 g. of diethyl hydrogen phosphite with a 20 min. reaction time, the reaction was again complete.

Example 33

Example 18 was duplicated using a 0.93 density polyethylene wax prepared by the pyrolysis of a high molecular weight 0.92 density polyethylene resin. The wax had an average of 1.0 double bond per molecule and an average molecular weight of 2000. Most of the double bonds were vinyl. The product was completely reacted as evidenced by its infrared spectrum which showed no residual double bond absorptions.

Example 34

Into a 2000 ml. equipped with a stirrer, condenser, dropping funnel, and thermometer there was placed 600 g. of a low molecular weight ethylene-propylene copolymer prepared by the pyrolysis of a high molecular weight copolymer. The material contained an average of 1 double bond per molecule, most of which were of the vinylidene type. To the polymer there was added 105 ml. of chlorobenzene and 54 g. of diethyl hydrogen phosphite and the mixture heated to reflux. A solution of 1.5 g. of di-t-butyl peroxide in 15 ml. of chlorobenzene was then added and the reaction mixture was refluxed for 20 minutes at which point the solvent and excess phosphite were removed under vacuum. The infrared spectrum of the residual tacky syrup showed a considerable reduction (>95%) in the double bond absorptions.

Example 35

Into a 500 ml. flask equipped with a stirrer, thermometer, condenser, and dropping funnel there was placed 100 g. of an 0.96 density, low molecular weight polyethylene prepared by direct polymerization of polyethylene using a silylchromate catalyst described in Belgian Patent 637,740, 17 ml. of chlorobenzene and 9 g. of diethyl hydrogen phosphite. The mixture was heated to reflux and 0.25 g. of di-t-butyl peroxide in 3 ml. of chlorobenzene was added. The mixture was refluxed for 20 minutes at which point it was poured into a large volume of acetone. The precipitated wax was filtered, washed with acetone, and dried. Its infrared spectrum showed none of the original vinyl absorption at 11.02µ indicating complete reaction.

Example 36

Using the apparatus and technique described in Example 18, 200 g. of the wax described in Examples 1–21 was reacted with 15 g. of dimethyl hydrogen phosphite. The infrared spectrum of the product had essentially no vinyl absorption indicating virtually complete reaction.

Example 37

Example 36 was duplicated using 33 g. of di-n-butyl hydrogen phosphite in place of the dimethyl hydrogen phosphite. The infrared spectrum of the product indicated over 90% of reaction.

Example 38

Into a 250 ml. flask there was placed 40 g. of the wax described in Examples 1–21, 10.4 g. of dilauryl hydrogen phosphite and 7 ml. of chlorobenzene. The mixture was heated to reflux and 0.1 g. of di-t-butyl peroxide in 5 ml. of chlorobenzene was added. The mixture was refluxed for 20 minutes and then poured into a large volume of acetone. After filtration and washing with additional acetone the product was dried. Its infrared spectrum indicated 84% of reaction to have occurred.

Example 39

A mixture of 200 g. of the polyethylene wax described in Examples 1–21, 100 ml. of chlorobenzene and 75 g. of the di-(polyalkyleneoxide) hydrogen phosphite of methoxy polyethylene glycol having a molecular weight of 350 was heated to reflux in a 100 ml. flask and a solution of 0.5 g. of di-t-butyl peroxide in 5 ml. of chlorobenzene was added. After 1.5 hours of reflux the mixture was poured into a large volume of acetone. The infrared spectrum of the product showed 42% reaction.

Example 40

Example 25 is duplicated using n-hexadecyldihydrogen phosphite in place of diethyl hydrogen phosphite. The product is a hard white wax and infrared spectrum shows substantially complete reaction.

Example 41

Example 4 is duplicated using n-butyl dihydrogen phosphite in place of diethyl hydrogen phosphite. The product is a hard white wax and infrared spectrum shows substantially complete reaction.

Example 42

Example 2 is duplicated using ethyl dihydrogen thiophosphite in place of diethyl hydrogen phosphite. The product is a hard wax and infrared spectrum shows substantially complete reaction.

Example 43

Example 29 is duplicated using di-n-heptyl hydrogen thiophosphite in place of diethyl hydrogen phosphite. The product is a hard wax and infrared spectrum shows substantially complete reaction.

PREPARATION OF AMINE MODIFIED POLYOLEFIN WAX ADDUCTS

Example 44

A mixture of 150 g. of the phosphonate ester wax prepared in Example 17 and 30 ml. of N,N-di-n-butyl-1,3-propanediamine were heated with stirring under nitrogen for 1 hour in a 500 ml. flask equipped with a stirrer, thermometer, condenser, and gas inlet tube. The molten wax was then poured into a large volume of acetone and the precipitated product filtered, washed with acetone, and dried. The infrared spectrum of the product showed all of the original phosphonate ester bands to have been shifted. For example, the phosphoryl absorption at $8.00\mu$ was shifted to $8.45\mu$. A chemical analysis indicated that two moles of amine had reacted.

For $C_{153}H_{313}N_4PO$: Calculated, percent: C—81.45, H—13.98, N—2.48, P—1.37. Found, percent: C—81.15, H—14.02, N—2.67, P—1.25.

Example 45

Example 44 was duplicated using 34 g. of N,N-diethyl-p-phenylenediamine. Again the infrared spectrum of the product showed complete reaction.

Example 46

Example 44 was duplicated using 29 g. of 3-(aminomethyl)-pyridine. The infrared spectrum of the product indicated almost complete reaction.

Example 47

Example 44 was duplicated using 14 g. of monoethanolamine at 160–170° C. The infrared spectrum of the product indicated complete reaction.

Example 48

Example 44 was duplicated using 20 g. of aniline. The infrared spectrum of the product indicated complete reaction.

Example 49

Example 44 was duplicated using 28 g. of n-octylamine. The infrared spectrum of the product indicated a very high degree of reaction.

Example 50

Example 44 was duplicated using 22 g. of N-methylaniline. The infrared spectrum of the product indicated complete reaction to have occurred.

Example 51

Example 44 was duplicated using 28 g. of di-n-butylamine with a reaction time of 6 hours at 200–215° C. The infrared spectrum showed almost complete reaction.

Example 52

Example 44 was duplicated using 15 g. of 1-amino-2-propanol at 185–190° C. for 1.5 hours. The infrared indicated almost complete reaction.

Example 53

Example 44 was duplicated using 18 g. of 2-amino-1-butanol. Infrared spectrum indicated complete reaction.

Example 54

Example 44 was duplicated using only 20 ml. of N,N-di-n-butyl - 1,3 - propanediamine. The infrared indicated complete reaction.

Example 55

Example 44 was duplicated using 20 g. of N,N-dimethylaminoethanol for 2 hours at 160° C. The infrared showed a low degree of reaction.

Example 56

Example 44 is duplicated using the adduct prepared in Example 40 and monoethanolamine. The infrared spectrum of the product indicates substantially complete reaction.

Example 57

Example 44 is duplicated using the adduct prepared in Example 41 and pyrrole. The infrared spectrum of the product indicates substantially complete reaction.

Example 58

Example 44 is duplicated using the adduct prepared in Example 42 and n-octylamine. The infrared spectrum of the product indicates substantially complete reaction.

Example 59

Example 44 is duplicated using the adduct prepared in Example 43 and aniline. The infrared spectrum of the product indicates substantially complete reaction.

Example 60

Example 44 is duplicated using the adduct prepared in Example 44 and ethoxyethylamine. The infrared spectrum of the product indicates substantially complete reaction.

EMULSIFICATION OF AMINE MODIFIED POLYOLEFIN WAX ADDUCTS

Examples 61–71

Emulsions were prepared in a 500 ml. stainless steel vessel equipped with a stirrer, thermometer and inlet tube and capable of being heated with pressurized steam and cooled with hot or cold water. A mixture of 100 g. of each of the amine modified wax adducts prepared in Examples 44, 46–53, and 55, 20 g. of oleic acid, 20 g. of morpholine and 40 g. of distilled water was placed in the vessel which was then closed. The mixture was heated with stirring for 30 minutes at which point 260 ml. of distilled water was pumped into the vessel while the temperature was maintained at 140° C. The mixture was stirred at 140° C. for about 20 minutes after all of the water had been added, and was then cooled. In each instance a fine particle size, stable emulsion was obtained which varied less than 1% in solids content after standing for one week.

Examples 72–74

The procedure of Examples 61–71 was used to form emulsions from the amine modified wax adducts of Examples 44, 46 and 54 using acetic acid and a cationic surface-active agent (Ethomeen) produced by reacting an aliphatic amine and ethylene oxide in place of oleic acid and morpholine. In each instance, a fine particle size, stable emulsion was obtained which varied less than 1% in solids content after standing for one week.

Examples 75–80

The procedure of Examples 61–71 is used to form emulsions from the amine modified wax adducts of Examples 45 and 56–60 using a sodium alkyl sulfate (tergitol) as a nonionic surface active agent in place of oleic acid and morpholine. In each instance, a fine particle size, stable emulsion is obtained which varies less than 1% in solids content after standing for one week.

Control I

The unmodified adduct prepared in Example 2 was subjected to the emulsion procedure of Examples 61–71. However, this adduct did not emulsify but instead formed a fine dispersion which creamed (separated) on standing.

We claim:

1. Process for preparing an amine modified polyolefin wax-alkyl phosphite adduct emulsifiable to fine particle size, stable emulsions which comprises reacting in the liquid phase a polyolefin wax having an average of at least about one-half of an olefinic double bond per polymer molecule and a molecular weight of from about 1000 to about 5000 with an alkyl phosphite having at least one hydrogen atom capable of entering into a free radical addition reaction with an olefinic double bond at a temperature of from about 130° C. to about 200° C. for a time sufficient to form an adduct thereof containing phosphonate ester groups and thereafter reacting said ester groups with an amine having at least one reactive amino hydrogen atom at a temperature of from about 150° C. to about 300° C. for a period of time sufficient to react at least about 25 percent of said phosphonate ester groups with said amine.

2. Process for preparing an amine modified polyolefin wax-alkyl phosphite adduct emulsifiable to fine particle size, stable emulsions which comprises reacting in the liquid phase a polyolefin wax having an average of at least about one-half of an olefinic double bond per polymer molecule and a molecular weight of from about 1000 to about 5000 with an alkyl phosphite having at least one hydrogen atom capable of entering into a free radical addition reaction with an olefinic double bond at a temperature of from about 130° C. to about 200° C. and for a period of time sufficient to react at least about 25 percent of said olefinic double bonds with said alkyl phosphite to form an adduct thereof containing phosphonate ester groups and thereafter reacting said ester groups with an amine having at least one reactive amino hydrogen atom at a temperature of from about 150° C. to about 300° C. for a period of time sufficient to react at least about 25 percent of said phosphonate ester groups with said amine.

3. Process of claim 2 wherein said polyolefin wax is a crystalline polyolefin wax.

4. Process of claim 2 wherein said phosphite has the formula

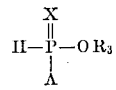

wherein X represents an atom selected from the group of oxygen and sulfur, $R_3$ represents an alkyl group having from 1 to 16 carbon atoms inclusive and A represents a member of the group of hydrogen and —$OR_4$ wherein $R_4$ is an alkyl group having from 1 to 16 carbon atoms inclusive.

5. Process of claim 2 wherein said amine has the formula

wherein $R_5$ represents a monovalent organic radical, $R_6$ represents a member of the group of hydrogen and a monovalent organic radical, and $R_5$ and $R_6$, when interconnected, represent a heterocyclic ring.

6. Process of claim 2 wherein said reacting with said amine is conducted in the absence of oxygen.

7. Process for preparing an amine modified polyolefin wax-alkyl phosphite adduct emulsifiable to fine particle size, stable emulsions which comprises reacting in the liquid phase a polyolefin wax having an average of at least about one olefinic double bond per polymer molecule a molecular weight of from about 1000 to about 5000 with an alkyl phosphite having the formula

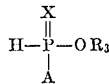

wherein X represents an atom selected from the group of oxygen and sulfur, $R_3$ represents an alkyl group having from 1 to 16 carbon atoms inclusive and A represents a member of the group of hydrogen and —$OR_4$ wherein $R_4$ is an alkyl group having from 1 to 16 carbon atoms inclusive in the presence of a free radical addition reaction initiator at a temperature of from about 135° C. to about 200° C. and for a period of time sufficient to react at least about 25 percent of said olefinic double bonds with said alkyl phosphite to form an adduct thereof containing phosphonate ester groups and thereafter reacting said ester groups with an amine having the formula

wherein $R_5$ represents a monovalent organic radical, $R_6$ represents a member of the group of hydrogen and a monovalent organic radical, and $R_5$ and $R_6$, when interconnected, represent a heterocyclic ring at a temperature of from about 150° to about 300° C. for a period of time sufficient to react at least about 50 percent of said phosphonate ester groups with said amine.

8. Process of claim 7 wherein at least about 50 percent of said olefinic double bonds are reacted with said alkyl phosphite.

9. Process of claim 7 wherein said alkyl phosphite has the formula

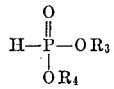

wherein $R_3$ and $R_4$ each represent an alkyl group having from 1 to 16 carbon atoms inclusive.

10. Process of claim 7 wherein said reaction between said polyolefin wax and said alkyl phosphite is carried out in an inert liquid solvent.

11. Process of claim 7 wherein said polyolefin wax is a crystalline polyolefin wax.

12. Process of claim 7 wherein said reacting with said amine is conducted in the absence of oxygen.

13. Amine modified polyolefin wax-alkyl phosphite adduct comprising an adduct of a polyolefin wax having an average of at least about one-half of an olefinic double bond per polymer molecule and a molecular weight of from about 1000 to about 5000, and an alkyl phosphite having at least one hydrogen atom capable of entering into a free radical addition reaction with an olefinic double bond wherein at least about 25 percent of said olefinic double bonds are reacted in the liquid phase at a temperature of from about 130° C. to about 200° C. with said alkyl phosphite to form said adduct containing phosphonate ester groups, at least about 25 percent of said phosphonate ester groups being reacted at a temperature of from about 150° C. to about 300° C. with an amine having at least one reactive amino hydrogen atom.

14. Amine modified polyolefin wax-alkyl phosphite adduct comprising an adduct of a polyolefin wax having an average of at least about one olefinic double bond per polymer molecule and a molecular weight of from about 1000 to about 5000, and an alkyl phosphite having the formula

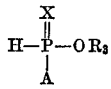

wherein X represents an atom selected from the group of oxygen and sulfur, $R_3$ represents an alkyl group having from 1 to 16 carbon atoms inclusive and A represents a member of the group of hydrogen and $-OR_4$ wherein $R_4$ represents an alkyl group having from 1 to 16 carbon atoms inclusive wherein at least about 50 percent of said olefinic double bonds are reacted in the liquid phase at a temperature of from about 130° C. to about 200° C. with said alkyl phosphite to form said adduct containing phosphonate ester groups, at least about 50 percent of said phosphonate ester groups being reacted at a temperature of from about 150° C. to about 300° C. with an amine having the formula $$R_5NHR_6$$

wherein $R_5$ represents a monovalent organic radical, $R_6$ represents a member of the group of hydrogen and a monovalent organic radical, and $R_5$ and $R_6$, when interconnected, represent a heterocyclic ring.

15. Modified polyolefin wax-alkyl phosphite adduct of claim 14 wherein said phosphite has the formula

wherein $R_3$ and $R_4$ each represent an alkyl group having from 1 to 16 carbon atoms inclusive.

16. Modified polyolefin wax-alkyl phosphite adduct of claim 14 wherein said polyolefin wax is a crystalline polyolefin wax.

17. A fine particle size stable emulsion comprising water, emulsifying agents and from about 5 to about 50 percent by weight of an adduct of a polyolefin wax having an average of at least about one-half of an olefinic double bond per polymer molecule and a molecular weight of from about 1000 to about 5000, and an alkyl phosphite having at least one hydrogen atom capable of entering into a free radical addition reaction with an olefinic double bond wherein at least about 25 percent of said olefinic double bonds are reacted in the liquid phase at a temperature of from about 130° C. to about 200° C. with said alkyl phosphite to form said adduct containing phosphonate ester groups, at least about 25 percent of said phosphonate ester groups being reacted at a temperature of from about 150° C. to about 300° C. with an amine having at least one reactive amino hydrogen atom.

18. A fine particle size, stable emulsion comprising water, emulsifying agents and from about 5 to about 50 percent by weight of an adduct of a polyolefin wax having an average of at least about one olefinic double bond per polymer molecule and a molecular weight of from about 1000 to 5000, and an alkyl phosphite having the formula

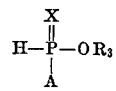

wherein X represents an atom selected from the group of oxygen and sulfur, $R_3$ represents an alkyl group having from 1 to 16 carbon atoms inclusive and A represents a member of the group of hydrogen and $-OR_4$ wherein $R_4$ represents an alkyl group having from 1 to 16 carbon atoms inclusive wherein at least about 50 percent of said olefinic double bonds are reacted in the liquid phase at a temperature of from about 130° C. to about 200° C. with said alkyl phosphite to form said adduct containing phosphonate ester groups, at least about 50 percent of said phosphonate ester groups being reacted at a temperature of from about 150° C. to 300° C. with an amine having the formula $$R_5NHR_6$$

wherein $R_5$ represents a monovalent organic radical, $R_6$ represents a member of the group of hydrogen and a monovalent organic radical, and $R_5$ and $R_6$, when interconnected, represent a heterocyclic ring.

19. Emulsion of claim 18 wherein said phosphite has the formula

wherein $R_3$ and $R_4$ each represent an alkyl group having from 1 to 16 carbon atoms inclusive.

20. Emulsion of claim 18 herein said polyolefin wax is a crystalline polyolefin wax.

References Cited

UNITED STATES PATENTS 2,811,514    10/1957    Hagemeyer _____ 260—94.9

JULIUS FROME, *Primary Examiner.*

T. MORRIS, *Assistant Examiner.*